(12) United States Patent
Sells et al.

(10) Patent No.: US 9,419,472 B2
(45) Date of Patent: Aug. 16, 2016

(54) MOBILE DEVICE SOLAR POWERED CHARGING APPARATUS, METHOD, AND SYSTEM

(71) Applicant: StrongVolt, Inc., San Diego, CA (US)

(72) Inventors: Ian Scott Sells, San Diego, CA (US); Adam Judah Weiler, San Diego, CA (US)

(73) Assignee: StrongVolt, Inc., San Diego, CA (US)

( * ) Notice: Subject to any disclaimer, the term of this patent is extended or adjusted under 35 U.S.C. 154(b) by 55 days.

(21) Appl. No.: 14/275,229

(22) Filed: May 12, 2014

(65) Prior Publication Data

US 2015/0130396 A1    May 14, 2015

Related U.S. Application Data

(60) Provisional application No. 61/904,358, filed on Nov. 14, 2013.

(51) Int. Cl.
*H02J 7/00* (2006.01)
*H02J 7/35* (2006.01)

(52) U.S. Cl.
CPC .................. *H02J 7/35* (2013.01); *H02J 7/0047* (2013.01); *H02J 7/0004* (2013.01); *H02J 2007/0095* (2013.01)

(58) Field of Classification Search
CPC ......... H02J 7/35; H02J 7/0047; H02J 7/0004; H02J 2007/0095
USPC .......................................... 320/101, 114, 162
See application file for complete search history.

(56) References Cited

U.S. PATENT DOCUMENTS

| | | | |
|---|---|---|---|
| 6,977,479 B2* | 12/2005 | Hsu ................................ | 320/101 |
| 7,679,312 B2 | 3/2010 | Toya | |
| 2005/0016579 A1 | 1/2005 | Elazari | |
| 2005/0162121 A1 | 7/2005 | Chan | |
| 2008/0125188 A1 | 5/2008 | Huang | |
| 2008/0179949 A1* | 7/2008 | Besser et al. .................... | 307/24 |
| 2008/0315825 A1* | 12/2008 | Lang ............................. | 320/101 |
| 2009/0128089 A1* | 5/2009 | Patino et al. .................. | 320/101 |
| 2009/0261777 A1 | 10/2009 | Chen | |
| 2009/0284216 A1* | 11/2009 | Bessa et al. .................... | 320/101 |
| 2010/0013428 A1 | 1/2010 | Shin | |
| 2010/0301798 A1 | 12/2010 | Chang | |
| 2011/0006905 A1* | 1/2011 | Masuda ..................... | 340/636.1 |
| 2011/0025255 A1 | 2/2011 | Aradachi | |
| 2011/0050416 A1 | 3/2011 | Lee | |
| 2011/0151943 A1 | 6/2011 | Lee | |
| 2011/0199040 A1* | 8/2011 | English et al. ................ | 320/101 |
| 2011/0234150 A1 | 9/2011 | Furukawa | |
| 2011/0273133 A1* | 11/2011 | Sala ............................. | 320/101 |

(Continued)

OTHER PUBLICATIONS http://www.suntactics.com/wp-content/uploads/2014/04/sCharger5Manualrev4.1.pdf.

*Primary Examiner* — Nathaniel Pelton
(74) *Attorney, Agent, or Firm* — San Diego Patent Prep & Pros, Inc.; Mary Fales (57) ABSTRACT

Apparatus, methods, and systems are described for a solar powered charger that is configured for charging a mobile device using solar panels or solar technology. The solar powered charger conditions the solar power into a form that is suitable for charging a mobile device. The charger controls the charging, may provide useful user feedback, and may provide for device selection.

17 Claims, 4 Drawing Sheets

(56) References Cited

U.S. PATENT DOCUMENTS

| | | |
|---|---|---|
| 2012/0019189 A1 | 1/2012 | Kim |
| 2012/0077552 A1* | 3/2012 | Bessa et al. ............ 455/573 |
| 2012/0091943 A1* | 4/2012 | Manor et al. ............ 320/101 |
| 2012/0176078 A1* | 7/2012 | English et al. ............ 320/101 |
| 2013/0134921 A1 | 5/2013 | Shen |
| 2013/0244727 A1 | 9/2013 | Lin |
| 2013/0252577 A1* | 9/2013 | Jordan .................... 455/406 |
| 2013/0285593 A1 | 10/2013 | Chu |
| 2014/0015470 A1* | 1/2014 | Lim et al. ................ 320/101 |
| 2014/0176043 A1 | 6/2014 | Fujiyama |
| 2014/0230882 A1 | 8/2014 | Hingley |
| 2014/0232343 A1 | 8/2014 | Tadd |
| 2014/0239881 A1* | 8/2014 | Cassidy .................. 320/107 |
| 2014/0261636 A1* | 9/2014 | Anderson ................ 136/251 |
| 2014/0265996 A1* | 9/2014 | Djeu ....................... 320/101 |
| 2015/0008865 A1* | 1/2015 | Wang et al. ............. 320/101 |
| 2015/0015179 A1* | 1/2015 | Yamada et al. .......... 320/101 |
| 2015/0048797 A1 | 2/2015 | Song |

* cited by examiner

MOBILE DEVICE SOLAR POWERED CHARGING APPARATUS, METHOD, AND SYSTEM

I. CLAIM TO PRIORITY UNDER 35 U.S.C. §119

The present application for patent claims the benefit of U.S. Provisional Application No. 61/904,358 filed on Nov. 14, 2013, entitled, "Devices, Methods, and Systems for Powering a Device by a Solar Panel," assigned to the assignee hereof, and expressly incorporated herein by reference in its entirety.

BACKGROUND

I. Field

The present disclosed embodiments relate to apparatus, methods, and systems for powering a mobile device using solar panels, energy, or technology.

II. Background

The use of mobile wireless devices has exploded in the last couple of decades. For example, in 1997 in the U.S. alone, it was estimated that there were 55.3 million wireless subscribers. Contrast that with 2012's estimated 326 million wireless subscribers. These upward trends continue as more devices are developed and more people have access to them. These devices consume power. Therefore, as the number of consumers increase, the power needed to operate these devices increase.

Typically, mobile devices require direct current (DC) power to operate. Thus, alternating current (AC), like an AC power outlet in a home, has to be converted to DC before the mobile device can use it. Mobile devices run off their own DC battery power when they aren't plugged into an AC source. When the mobile device is running off its battery power, the battery discharges rather quickly. Mobile device batteries only have so much capacity to hold a charge. In spite of technological advances, these devices still consume lots of power over time. There is a wide variation in device usage and "talk time," but typically a mobile device needs to be recharged every day. This daily need to recharge is inconvenient and it's potentially harmful to the environment, because current electrical power sources are primarily finite.

As more finite power consumption increases, the need for renewable energy alternatives has increased in response. Renewable energy sources are important, because they provide clean energy that isn't finite. One of the more popular renewable energy sources is solar energy. Solar energy is abundant in supply and is fairly inexpensive. Solar technology may be used to generate electrical power by converting solar radiation into direct current (DC). This process is accomplished through the use of solar cells (also known as photovoltaic cells). The solar cells may be arranged and packaged to form a solar panel, which can be used alone or in conjunction with other solar panels, to generate electricity. Solar technology has been advancing to maximize the output of electrical energy while minimizing the system costs. As a result, solar technology has been incorporated into various applications. For example, many homes now have solar roof panels to augment the household electricity. Lately, there have been significant efforts to apply solar technology to low power devices. Specifically, there have been attempts to use solar technology for the purpose of charging a mobile device.

Several drawbacks currently exist with current solar mobile charging systems. First, mobile device batteries typically have specific charge patterns due to their chemical composition characteristics. Some common chemical compositions used for mobile devices are, for example, lithium-ion (Li-ion), sealed-lead-acid (SLA), or nickel-metal-hydride (NiMH). If the batteries in the devices are improperly charged, amongst other things, it can cause the batteries to overheat or lower their charge capacity. It may also damage the mobile device connected to them. Moreover, some devices will reject the incoming charge if the voltage and current are not stable and regulated. Currently, existing mobile solar charging systems do not have a way to effectively regulate voltage that is delivered to the mobile device. The power delivered may spike, be internment, or inconsistent. Thus, causing damage to the battery and/or the mobile device. Moreover, they may require some form of AC power, and not be a stand alone solar powered system. Some users carry mobile devices on camping trips or into remote areas where no electrical source is available. Thus, a device charger that works solely off solar power is ideal for those types of applications. Moreover, with the current solar mobile charging systems, there is no way of knowing whether a mobile device is charged and ready for use. In conjunction, users may not be aware of sufficient or insufficient power being delivered to the mobile devices. Therefore, there is a need in the art to provide an efficient and reliable solar powered charging apparatus, method, and system that also provides user feedback.

SUMMARY

An apparatus, method and system for charging a mobile device primarily using solar technology is disclosed. In an embodiment of the present application an apparatus is disclosed that comprises: a voltage conditioning module configured to receive power from a solar energy convertor; a current detection module configured to detect the voltage conditioning module output current; a control module configured to compare the voltage conditioning module output current to a predetermined threshold, and to allow a mobile device to be charged based on the predetermined threshold; and a user indication module configured to provide user feedback based on an event. Moreover, the apparatus may comprise a device selection module configured to indicate the type of mobile device to charge. It may also, be configured to provide user feedback in the form of at least one selected from the group consisting of: audio feedback, visual feedback, and tactile feedback. The apparatus may have a visual feedback of at least one light emitting diode (LED), wherein the at least one LED emits a green or a red light. Furthermore, the apparatus may have the predetermined threshold based on the type of mobile device to be charged and may be in the range between 0.01 and 4.0 amps, and the control module may be configured to determine a time period that the voltage conditioning module output current is above the predetermined threshold, and to allow the mobile device to be charged based on the time period The apparatus may have the voltage conditioning module configured to output voltage between 4.75 V and 5.25 V with an output current of up to 4 amps.

In another embodiment of the present application an apparatus for charging a mobile device using solar technology is disclosed that comprises: means for receiving power from a solar energy convertor; means for conditioning the power from the solar energy convertor; means for detecting a current level; means for comparing the detected current level to a predetermined threshold; means for charging a mobile device based on the predetermined threshold; and means for indicating to a user charging events. Moreover, the apparatus may comprise means for indicating the type of mobile device to charge. In addition, it may comprise means for indicating to a user charging events, comprising: at least one selected from the group consisting of: means for audio feedback, means for visual feedback, and means for tactile feedback. Also, the apparatus may comprise means for visual feedback comprises at least one light emitting diode (LED), wherein the at least one LED emits a green or a red light. In addition, the predetermined threshold may be based on the type of mobile device to be charged and is in the range between 0.01 and 4.0 amps, and there may be means for determining a time period that the detected current is above the predetermined threshold, and means for charging the mobile device based on the time period. Moreover, the means for conditioning the power from the solar energy convertor may be configured to output voltage between 4.75 V and 5.25 V with an output current of up to 4 amps. In addition, the charging events comprise at least one selected from the group consisting of: the mobile device is fully charged, the power from the solar energy convertor is below the predetermined threshold, the power from the solar energy convertor is below the predetermined threshold for a determined time period, the mobile device charging is reconnected, the power from the solar energy convertor is above the predetermined threshold, and the power from the solar energy convertor is above the predetermined threshold for a determined time period.

In an embodiment of the present application, an apparatus for charging a mobile device primarily using solar technology is disclosed comprising: a voltage conditioning circuit capable of receiving solar generated DC power and outputting regulated DC power; a current detection circuit capable of detecting the voltage conditioning circuit output current level; a processor configured to compare the voltage conditioning circuit output current to a predetermined threshold, and to allow a mobile device to be charged based on the predetermined threshold, wherein the processor is associated with memory; and a user indication circuit capable of providing user feedback based on an event. The apparatus may comprise a device selection circuit capable of indicating the type of mobile device to charge. In addition, the user indication circuit may be capable of providing user feedback in the form of at least one selected from the group consisting of: audio feedback, visual feedback, and tactile feedback. Moreover, the visual feedback comprises at least one light emitting diode (LED), wherein the at least one LED emits a green or a red light. In addition, the predetermined threshold may be based on the type of mobile device to be charged and is in the range between 0.01 and 4.0 amps, and wherein the processor is further configured to determine a time period that the voltage conditioning circuit output current is above the predetermined threshold, and to allow the mobile device to be charged based on the time period. Also, the apparatus may allow the voltage conditioning circuit to be capable of outputting voltage between 4.75 V and 5.25 V and current of up to 4 amps. In another embodiment, the event may comprise at least one selected from the group consisting of: the mobile device is fully charged, the voltage conditioning circuit output current is below the predetermined threshold, the voltage conditioning circuit output current is below the predetermined threshold for a determined time period, the mobile device charging is reconnected, the voltage conditioning circuit output current is above the predetermined threshold, and the voltage conditioning circuit output current is above the predetermined threshold for a determined time period.

BRIEF DESCRIPTION OF THE DRAWINGS

The present embodiments may be better understood by referring to the following figures. The figures are presented for illustration purposes.

DETAILED DESCRIPTION

Each of the additional features and teachings disclosed below can be utilized separately or in conjunction with other features and teachings to provide an apparatus, method, and system for a solar powered mobile device charger. Representative examples of the present embodiments, will now be described in further detail with reference to the attached drawings. This detailed description is merely intended to teach a person of skill in the art details for practicing the preferred aspects of the present teachings and is not intended to limit the scope of the embodiments.

The disclosed embodiments describe a solar powered charger for mobile devices. Mobile devices may include, but are not limited to the following: cell phone, mobile phone, tablet, laptop, computer, handheld radio, PDA, smart phone, GPS receiver, speakers, battery packs, e-reader, personal wearable device, fitness device, camera, or any similar low powered portable user device. The solar powered charger may be configured for use with any suitable mobile device that requires charging of a power source for operation.

Solar power, solar energy conversion, or solar technology as understood herein may include any solar technology or system that converts light into electricity. Light may be from solar or an artificial source. Moreover, the disclosed embodiments anticipate advances in solar technology that may work with the described embodiments, but are unforeseen at this time. In addition, the present disclosed embodiments may receive input not just from solar power technology, but other sources as well. For example, a DC source generated from a source other than solar that requires conditioning like a solar panel may be used. An example of this may be a small wind turbine. Wind turbines can generate AC or DC depending on their generator. Currently, a common type of solar powered technology is a solar panel. A solar panel may comprise many connected solar cells. A solar cell, or a photovoltaic cell, is an electrical component that converts the energy of light directly into electricity. The disclosed embodiments accept the solar generated electricity as input and efficiently regulate, condition, and control the received solar generated electricity in order to output regulated electricity to a mobile deceive, so that the mobile device's battery may charge. The described embodiments also provide useful feedback to the user on the sufficiency or quality of the electricity provided to the mobile device, as well as other useful feedbacks like indications when the mobile device charging is complete. Moreover, the described embodiments describe a solar powered charger that can be customized and configured to charge a variety of mobile devices.

Figure 1:
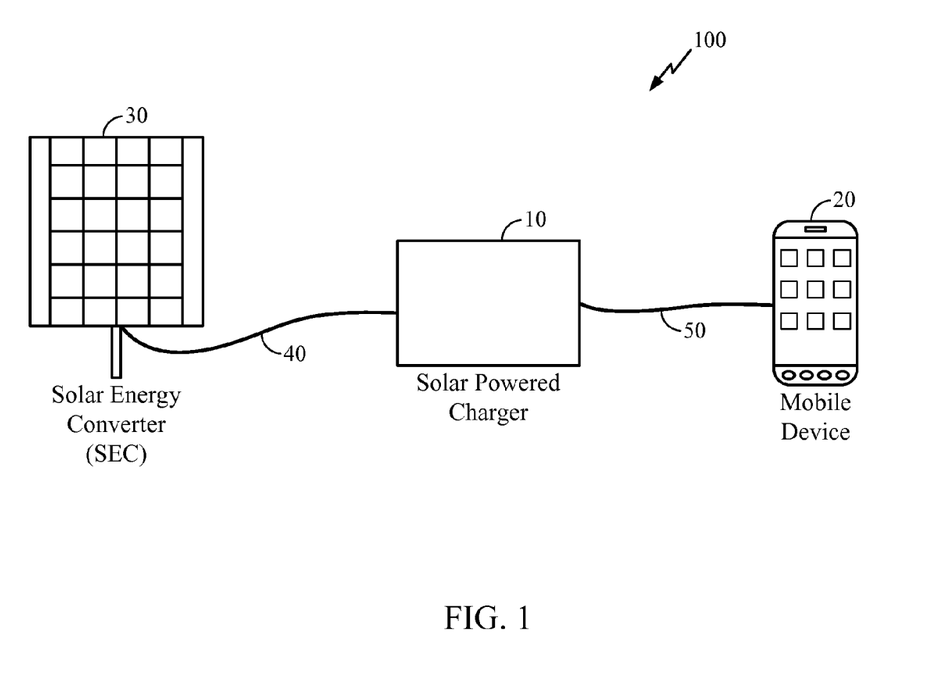
FIG. 1. Illustrates a solar powered charging system that demonstrates an aspect of the disclosed embodiments.

Referring to FIG. 1. which illustrates a solar powered charging system 100 that demonstrates an aspect of the disclosed embodiments. In FIG. 1, a solar energy converter (SEC) 30, like a solar panel for example, may be connected to a solar powered charger 10. In some embodiments, the SEC 30 may comprise power generated from something besides solar technology that requires conditioning like solar technology. For example, a small wind turbine AC or DC generator could be a SEC 30. In an aspect of the disclosed embodiments, a solar panel may be used as the SEC 30. The solar panel may be small, portable and configured to be carried inside a foldable carrier or other suitable carrying device. The solar panel may be any type, size, or shape suitable to charge a mobile device. Typical mobile devices run at lower powers, so the solar panel may provide, for example, between 0.5 and 18 watts. However, higher powered panels or SECs may be used. For example, a power range of up to hundreds of watts may be used to power an appliance like a TV. It should be understood that in some embodiments the more power produced by the solar panel, the faster the mobile device may be charged. Also, more than one solar panel may be used and/or connected to the solar powered charger 10. The solar powered charger 10 may be connected to a mobile device 20. The connection between the SEC 30 and the solar powered charger is shown in FIG. 1 as connection 40. Likewise, the connection between the solar powered charger and the mobile device is shown as connection 50. Connection 40 may be accomplished through the use of a cable suitable for carrying the solar generated electricity to the solar powered charger 10. The cable may be an off-the-shelf cable commonly found in stores, or may be a custom cable that is provided by the SEC manufacture, or may be an industry standard cable. Likewise, connection 50 may be accomplished through the use of a cable suitable for carrying the regulated electricity to the mobile device 20. This cable may be an off-the-shelf cable commonly found in stores, may be a custom cable provided by the mobile device manufacturer, or may be an industry standard cable. In one embodiment, the cable 50 may be a universal serial bus (USB) cable. Moreover, connections 40 and 50 may be physical connectors that connect directly to each other via a connector with no cable in-between. For example, connection 50 may be a USB "plug" that plugs into the mobile device's charging port.

Figure 2:
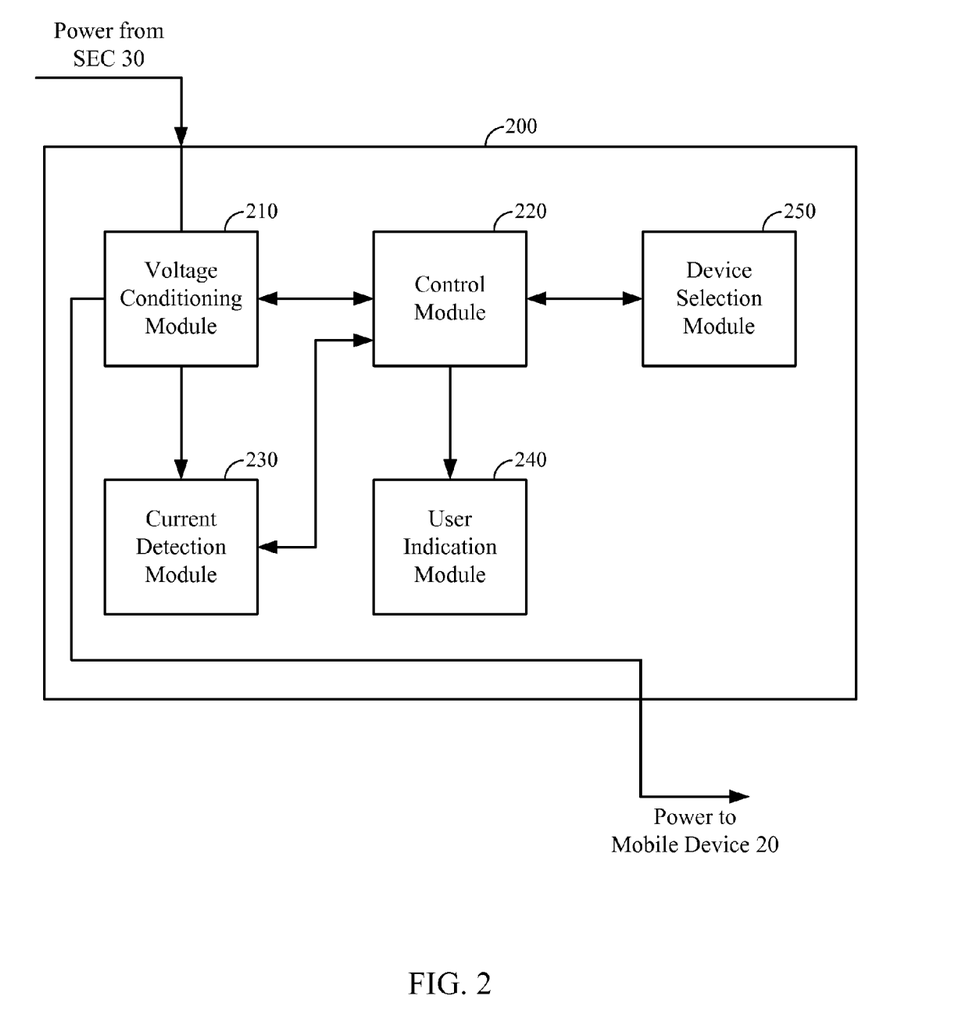
FIG. 2. Illustrates an aspect of the disclosed solar powered charger embodiments.

Referring now to FIG. 2. which describes aspects of the disclosed solar powered charger 10 in more detail 200. The solar powered charger 200 receives the power from the SEC 30. The solar generated power coming from the SEC 30 typically has very low voltages and current. The voltage and current will vary as the light source varies, because depending on how much (and the quality) of the light, the cells will produce electricity proportionally. For example, a solar cell may provide voltages around 0.5 v and current around 100 mA. In some embodiments, the solar cell may provide up to 12 v and 2 A. This voltage and current may vary over time, and may be too low to charge a mobile device. Thus, the solar power coming from the SEC 30 isn't suitable to charge the mobile device directly. Mobile devices, for example, may need 3 v to 5 v and 500 mA to 1.2 A of current to charge. Therefore, one aspect of the solar powered charger 200 is to regulate and convert the incoming solar power to something a mobile device can use. For example, if the solar power coming in is 0.5 v and the power needed to charge a mobile device is 5 v, then the power would need to be unconverted. Further, the solar powered charger 200 may be used to smooth-out the power delivered to the mobile device avoiding any spiking or similar effects.

Figure 4:
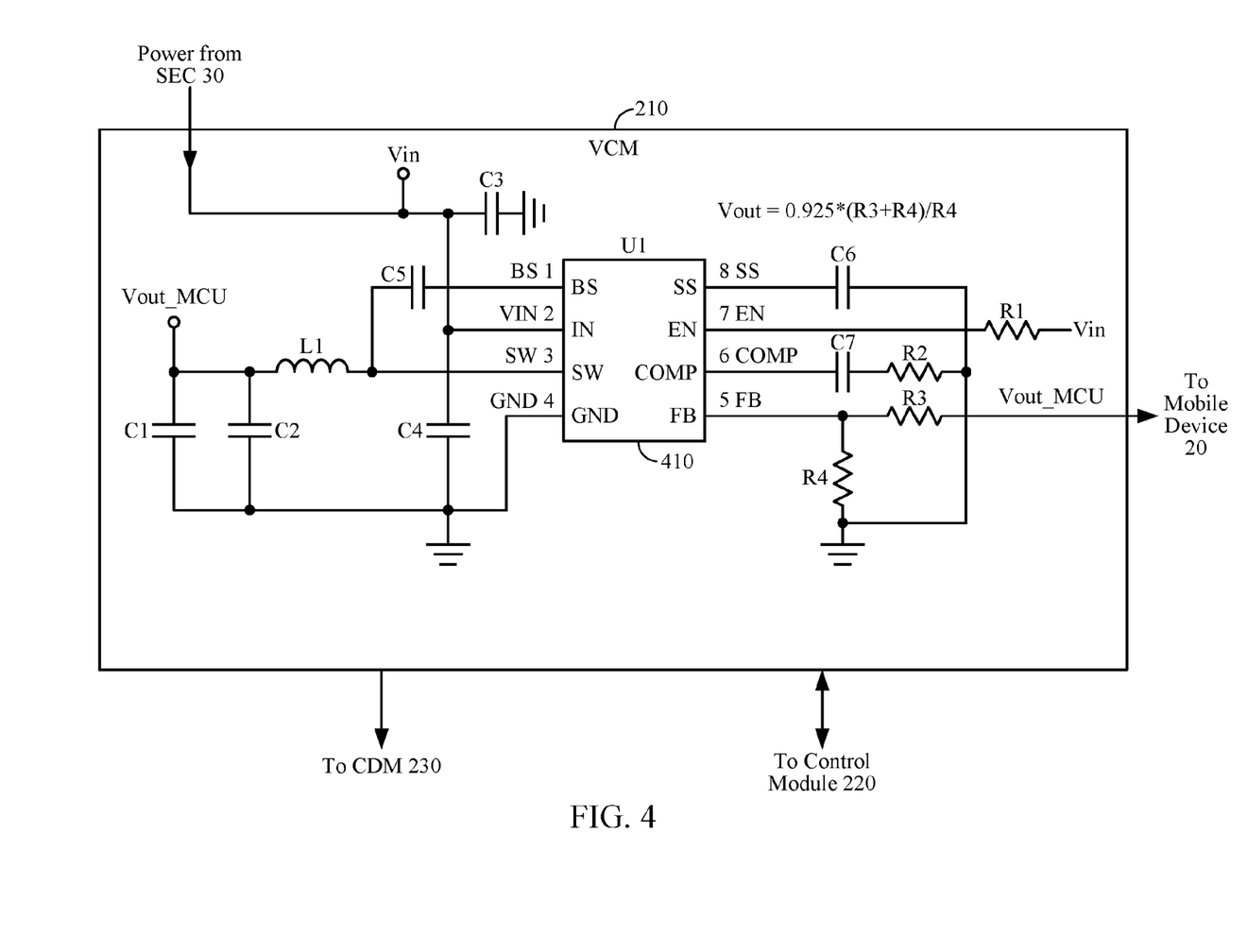
FIG. 4. Illustrates an aspect of a voltage control module embodiment.

In an aspect of the disclosed embodiments the solar powered charger 200 contains a voltage conditioning module (VCM) 210. The VCM 210 may also be referred to as a voltage stabilizing circuit (VSC). The VCM 210 may be used to regulate the voltage received from the SEC 30. The VCM 210 may increase the current and voltage from the SEC 30. FIG. 4 illustrates an aspect of a VCM in an embodiment. The VCM may be configured as a synchronous rectified step-down converter whose output voltage may be defined as Vout=0.925*(R3+R4)/R4. In FIG. 4 U1 410 is a synchronous rectified step-down converter. Resistor R3 is between U1's 410 feedback pin and the node labeled Vout_MCU (Vout) as shown in FIG. 4. Resistor R4 is between U1's 410 feedback pin and ground as shown in FIG. 4. Node Vout_MCU can be used to power a mobile device 20. Power from the SEC 30 supplies U1's 410 voltage input pin (IN). Capacitors C1-C7, resistor R1, and inductor L1 are used to enable the convertor U1 to work properly per manufacture and circuit design considerations as is well known in the art. In one embodiment, the VCM 210 may regulate its output voltage between 4.75 V to 5.25 V with an output current of up to 2 to 4 Amps. In another embodiment, the VCM may have up to an efficiency of 95%. In other embodiments, the VCM 210 may be configured to provide a voltage that is stabilized for a specific mobile device, or range of mobile devices. In another embodiments, the VCM 210 may output a voltage that complies with the USB standard voltages and currents.

In another aspect of the disclosed embodiments, solar powered charger 200 may have a control module 220. The control module 220 may also be known as a charge control circuit (CCC). Control module 220 may be powered by some of the VCM's 210 output. The control module 220 may be, but is not limited to, any type of programmable logic devices such as micro processors, Central Processing Units (CPUs), microcontrollers, erasable programmable devices, Digital Signal Processors (DSPs), or other suitable devices. The control module 220 may be programmed using software, firmware, or a combination of both. The control module 220 may be configured to measure the available current and/or voltage coming from the VCM 210 in order to determine if there is enough, as well as a stable, charge available for the mobile device 20. In another aspect of the disclosed embodiments, the solar powered charger 200 may utilize a current detecting module 230 that detects the mobile device's 20 current levels and/or the VCM's 210 current level. The current detection module 230 may be any appropriate device, circuit, or combination thereof that can measure and/or detect current. The current detection module 230 may be connected to the VCM 210, the control module 220, or circuitry associated with the mobile device 20.

The VCM 210 current output may be an indication of the SEC 30 power levels, because it receives its power from the SEC 30. The control module 220 may be configured to have a predetermined current and/or voltage threshold. The control module 220 may use this predetermined threshold, amongst other things, to make decisions regarding the charging of the mobile device 20 and user feedback. The threshold value may be variable, changeable, programmable, or hardwired. The control module 220 may also define a threshold time period for determining how long the threshold level needs to be met (or not met). If the threshold has been met for a given period of time, the control module 220 may determine that the VCM 210 power is stable enough to charge a mobile device. Thus, control module 220 may want to wait to power the mobile device until it can sense that the power coming from the VCM 210 is stable. In one embodiment, the threshold time period may be approximately three seconds. In other embodiments, the threshold time period may be any sufficient time period to determine that the power level to the mobile device has been stabilized. In yet another embodiment, the current threshold value may be between 100 milliamps and 1000 milliamps or more. In another embodiment the predetermined threshold may be in a range between 0.01 and 4.0 amps. Once the control module senses that the threshold value has been met, and that the power is stable, the control module 220 may charge the mobile device 20. If the control module 220 senses that the VCM 210 current is below the threshold and/or instable, the power sent to the mobile device 20 may be stopped. Once the power is determined to be appropriate again, the control module 220 may reconnect the mobile device 20 in order to continue charging.

The solar powered charger 200 may provide a variety of user feedback. In an aspect of the disclosed embodiments a user indication module 240 may indicate charging events to a user. The control module 220 may direct the user indication module 240 to indicate events. The user indication module 240 may be hardwired to indicate events independent of the control module 220, or in conjunction with the control module 220. The user indication module may use a variety of user feedback methods to indicate events to a user. For example, in an embodiment, the control module 220 may indicate to a user via the user indication module 240 when the power from the VCM 210 has stabilized and is appropriate to charge the mobile device 20. The feedback may be audio, visual, or tactile. In an embodiment, as a form of visual feedback, light emitting diodes (LED) may be used. The LEDs may be a variety of different colors, discreet LEDs, a type of screen, led panel, or may be single LEDs that varies color according to the voltage applied to it. In yet another embodiment, audio feedback may be used, such as a piezoelectric speaker, buzzer, sound chip, speaker, or vibrator. In yet another embodiment, a tactile feedback may be used such as a vibrator, or mechanical button. In an embodiment, using LEDs as user feedback indicators, an LED may light up as green when the mobile device is fully charged. The LED may also light up as green based on a predetermined value. This value may vary from mobile device to mobile device. In some embodiments, the predetermined value may be between 5 and 100 percent of a total charge. In other embodiments, the LED may be green to indicate that there is enough power and/or current to charge the mobile device. Moreover, timing of the lighting of the LED may be used to indicate to the user events. For example, the LED may light up as solid green to indicate it has enough power and is charging, but flash on/off green when the mobile device is fully charged. In other embodiments, the LED may be red indicating that there is not enough power or current to charge the mobile device. Also, the LED may light up red when the mobile device is not charging. In still other embodiments, the LED color may indicate the power to the mobile device is stable and/or sufficient (green). Conversely, the LED color may indicate the power to the mobile device is spiking, not sufficient, or unstable (red). In another embodiment an LED display may be used to indicate user feedback. For example, a seven segment LED display may be used. A number or a letter may indicate the appropriate events to a user. In another embodiment an liquid crystal display (LCD) or similar display device may be used to indicate user feedback. In another embodiment an audio feedback may be used. For example, a buzzer may buzz at differ frequencies (sounds) to indicate the appropriate events to the user. In an embodiment a sound chip may be used to indicate audio feedback. In another embodiment a tactile feedback may be used. For example, a braille electronic indicator may be used, or a vibrator.

The solar powered charger 200 may also include a device selection module 250 that may allow a user to select different types of mobile devices to be charged. In an embodiment, the device selection module 250 may be implemented with a hardware switch. The hardware switch can be switched into different positions to indicate which mobile device will be charged by the solar powered charger 200. In another embodiment the device selection module 250 may be an auto-detection function of the control module 220. When a mobile device is connected to the solar powered charger 220, the control module can determine which mobile device needs to be charged and adjust the charge accordingly. In yet another embodiment, a combination of auto-detection and hardwired switch may be used by the device selection module 250. One of skill in the art would readily know the solar powered charger 200 may determine, sense, or otherwise be programmed and/or hardwired with the characteristics necessary to optimally charge the selected device. It should be understood that any of the components of the solar powered charger 200 may be configured in software, hardware, or a combination of both. In addition, any components of the solar powered charger 200 may be integrated on a single chip together or may be stand-alone devices.

Figure 3:
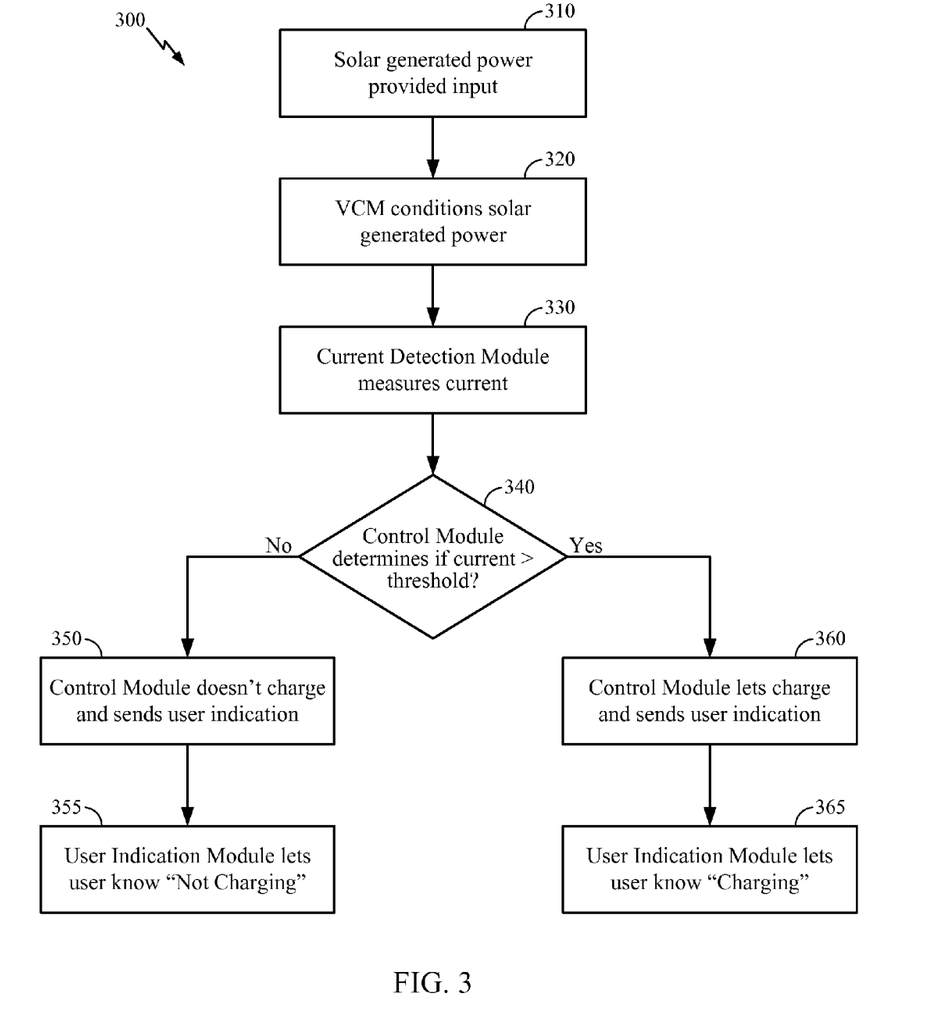
FIG. 3. Illustrates an aspect of the disclosed solar powered charger embodiments in the form of a flow chart.

FIG. 3. Illustrates an aspect of the disclosed solar powered charger embodiments shown in FIG. 2. in the form of a flow chart 300. At step 310 solar power, from a suitable solar energy convertor, may be inputted to the voltage conversion module 210. At step 320 the voltage conversion module 210 may condition the incoming solar power into a form that is suitable for charging a mobile device. At step 330 the current detection module 230 may measure the voltage conversion module 210 output current. At step 340 the control module 220 may determine if the output current is below or above a predetermined threshold. If the current is below the threshold, then the process continues at step 350. At step 350 the control module 220 may not allow the mobile device to charge and direct the user indication module 240 to send user feedback. At step 355 the user indication module 240 can signal the user as indicated by the control module 220. For example, the user indication module 240 may comprise an LED that turns red to indicate that the mobile can't be charged at this time. If the current is above the predetermined threshold in step 340, then the process continues to step 360. At step 360 the control module 220 may allow the mobile device to charge and indicate this to a user through the user indication module 240. At step 365 the user indication module 240 may signal to the user some feedback as indicated by the control module 220. For example, the user indication module 240 may comprise an LED that turns green to indicate that the mobile can be charged at this time.

In an embodiment of the present application the voltage conditioning module 210 may be implemented in part using a voltage conditioning circuit that comprises a simple step-up step-down voltage regulator, or an adjustable low-dropout voltage regulator. In some embodiments a KF2953A regulator, or its equivalent, may be used. The voltage conditioning circuit may be configured to be able to charge a range of mobile devices. The voltage may be further conditioned by another regulator, such as a low drop out regulator (LDO), so that the LDO can power other components and/or devices in the circuit with a different voltage. In an embodiment a 3V to 3.3V LDO may be used. In some embodiments a KF7533 3.3V regulator, or its equivalent, may be used. The voltage conditioning module 210 may also feed the current detection module 230. A current detection circuit may comprise part of the current detection module 230. A suitable voltage, such as 3.3 v from the LDO may power a processor and relating circuitry as part of the control module 220. The control module 220 may comprise a processor. In an embodiment, the processor may be a HT46R01C or its equivalent. The processor may send and receive signals to and from the current detection circuits. The detection circuits may measure and/or detect currents and send signals to and from the processor in the control module 220. The processor may preform various measurements, decisions, functions, and send and receive signals form the circuits in order to control the charging of a mobile device as disclosed in the various embodiments. A form of internal or external memory may be associated with the processor circuitry. The processor may compare the current from the current detection circuits and determine if they are below of above a predetermined threshold. If the current, for example, is below the predetermined threshold, the processor may control the circuitry to prevent the mobile from being charged. If the current, for example, is above the predetermined threshold, the processor may allow the circuitry to charge the mobile device. Simple transistor circuits may be used as part of the current detection circuitry to detect current levels. For example, a 2N3904 and AP9435GG-HF, or their equivalents, may be used. The user indication module 240 may comprise a user indication circuit. The user indication circuit may be powered by the same source that powers the processor. The processor may send signals to and from the user indication circuit in order to inform a user of the charging status and/or processor decisions. As described previously, a red and green colored LED circuit may comprise the user indication circuitry. Also, certain charging events may trigger the processor to send signals to a user via the user indication circuit. The device selection module 250 may comprise a device selection circuit that may receive input from a switch or other means that indicate what type of mobile device needs charged. The device selection circuit may be an auto-detecting mechanism. For example, the processor may be able to detect what type of mobile device to charge based on the device plugged into the solar powered charger via connection 50. In an embodiment, a simple switch may be used for purposes of the device selection circuit. For example, a small sliding switch like a 2P3T, or its equivalent, may be used. The device selection circuit can send and receive signals to and from the processor.

In other embodiments, the processing modules may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The present embodiments or any part(s) or function(s) thereof, may be implemented using hardware, software, or a combination thereof, and may be implemented in one or more computer systems or other processing systems. A computer system for performing the operations of the present embodiment and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the embodiment using other computer systems and/or architectures.

The foregoing description of the preferred embodiments has been presented for purposes of illustration and description. It is not intended to be exhaustive or to limit the embodiments to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the embodiment and its best mode practical application, thereby to enable others skilled in the art to understand the various embodiments and with various modifications as are suited to the particular use or implementation contemplated. It is intended that the scope of the embodiments be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

It should be understood that the figures illustrated in the attachments, which highlight the functionality and advantages of the present embodiment, are presented for example purposes only. The architecture of the present embodiment is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present embodiment in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. A process or method may be implemented with a processor, or similar device, or any combination of hardware and software.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices. Moreover, a micro processor, or similar device may have internal or external memory associated with it.

The various features of the embodiment described herein can be implemented in different systems without departing from the embodiment. It should be noted that the foregoing embodiments are merely examples and are not to be construed as limiting the embodiment. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for charging a mobile device using solar technology, comprising:
   a mobile device selection module configured to indicate the type of mobile device to charge comprising both a hardware switch and auto-detection used in combination with each other to indicate the type of mobile device to charge;
   a voltage conditioning module configured to receive power from a solar energy convertor, without any configuration to receive power from another power source other than a solar energy convertor, the voltage conditioning module comprising a first resistor R3 and a second resistor R4 and a synchronous rectified step-down converter whose output voltage is defined as the product of 0.925 times (R3+R4)/R4;
   a current detection module configured to detect the voltage conditioning module output current;
   a control module configured to compare the voltage conditioning module output current to a predetermined threshold, and to allow the mobile device to be charged based on the predetermined threshold, to accept device type information from the device selection module and charge the mobile device based on the device type information received from the device selection module, wherein the mobile device isn't charged with a battery internal to the apparatus for charging a mobile device, wherein the predetermined threshold is based on the type of mobile device to be charged and is in the range between 0.01 and 4.0 amps, the control module is further configured to determine a time period that the voltage conditioning module output current is above the predetermined threshold and to allow the mobile device to be charged based on the time period;
   a user indication module configured to provide user feedback based on an event.

2. The apparatus of claim 1, wherein the mobile device selection module is configured to indicate the type of mobile device to charge from at least one selected from the group consisting of: an appliance, a TV, mobile phone, tablet, laptop, computer, handheld radio, PDA, smart phone, GPS receiver, speakers, battery packs, e-reader, personal wearable device, fitness device, and camera.

3. The apparatus of claim 1, where the user indication module is configured to provide user feedback in the form of at least one selected from the group consisting of: audio feedback, visual feedback, and tactile feedback.

4. The apparatus of claim 3, where the visual feedback comprises at least one light emitting diode (LED), wherein the at least one LED emits a green or a red light.

5. The apparatus of claim 1, wherein the voltage conditioning module is further configured to output voltage between 4.75 V and 5.25 V with an output current of up to 4 amps.

6. An apparatus for charging a mobile device using solar technology, comprising:
   means for receiving power from a solar energy convertor;
   means for indicating the type of mobile device to charge from a plurality of mobile device types, wherein the means for indicating the type of mobile device to charge from a plurality of mobile device types comprises both a hardware switch and auto-detection used in combination with each other to indicate the type of mobile device to charge;
   means for conditioning the power from the solar energy convertor, without any other means for receiving power from another power source other than a solar energy convertor, the means for conditioning comprising a first resistor R3 and a second resistor R4 and a synchronous rectified step-down converter whose output voltage is defined as the product of 0.925 times (R3+R4)/R4;
   means for detecting a current level;
   means for comparing the detected current level to a predetermined threshold;
   means for accepting device type indication from the means for indicating;
   means for charging the mobile device based on the predetermined threshold, wherein the mobile device is charged according to the device type indication received from the device selection module, wherein the mobile device isn't charged with a battery internal to the apparatus for charging a mobile device, wherein the predetermined threshold is based on the type of mobile device to be charged and is in the range between 0.01 and 4.0 amps;
   means for determining a time period that the detected current is above the predetermined threshold;
   means for charging the mobile device based on the time period; and
   means for indicating to a user charging events.

7. The apparatus of claim 6, wherein the type indication is at least one selected from the group consisting of: an appliance, a TV, mobile phone, tablet, laptop, computer, handheld radio, PDA, smart phone, GPS receiver, speakers, battery packs, e-reader, personal wearable device, fitness device, and camera.

8. The apparatus of claim 6, wherein the means for indicating to a user charging events, further comprises:
   at least one selected from the group consisting of: means for audio feedback, means for visual feedback, and means for tactile feedback.

9. The apparatus of claim 8, where the means for visual feedback comprises at least one light emitting diode (LED), wherein the at least one LED emits a green or a red light.

10. The apparatus of claim 6, wherein the means for conditioning the power from the solar energy convertor is configured to output voltage between 4.75 V and 5.25 V with an output current of up to 4 amps.

11. The apparatus of claim 6, wherein the charging events comprise at least one selected from the group consisting of: the mobile device is fully charged, the power from the solar energy convertor is below the predetermined threshold, the power from the solar energy convertor is below the predetermined threshold for a determined time period, the mobile device charging is reconnected, the power from the solar energy convertor is above the predetermined threshold, and the power from the solar energy convertor is above the predetermined threshold for a determined time period.

12. An apparatus for charging a mobile device using solar technology, comprising:
   a device selection circuit capable of indicating the type of mobile device to charge from a plurality of mobile device types, wherein a device selection circuit module capable of indicating the type of mobile device to charge from a plurality of mobile device types comprises both a hardware switch and auto-detection used in combination with each other to indicate the type of mobile device to charge;

a voltage conditioning circuit capable of receiving solar generated DC power and outputting regulated DC power, without any other circuitry to receive power from another power source other than solar generated DC power, wherein the voltage conditioning circuit comprising a first resistor R3 and a second resistor R4 and a synchronous rectified step-down converter whose output voltage is defined as the product of 0.925 times (R3+R4)/R4;

a current detection circuit capable of detecting the voltage conditioning circuit output current level;

a processor configured to compare the voltage conditioning circuit output current to a predetermined threshold, to accept device type indication from the device selection circuit, and to allow the mobile device to be charged based on the predetermined threshold and the device selection type indication received from the device selection circuit, wherein the mobile device isn't charged with a battery internal to the apparatus for charging a mobile device, wherein the processor is associated with memory, wherein the predetermined threshold is based on the type of mobile device to be charged and is in the range between 0.01 and 4.0 amps, the processor is further configured to determine a time period that the voltage conditioning circuit output current is above the predetermined threshold and to allow the mobile device to be charged based on the time period; and a user indication circuit capable of providing configured to provide user feedback based on an event.

13. The apparatus of claim 12, wherein the device selection type indication is at least one selected from the group consisting of: an appliance, a TV, mobile phone, tablet, laptop, computer, handheld radio, PDA, smart phone, GPS receiver, speakers, battery packs, e-reader, personal wearable device, fitness device, and camera.

14. The apparatus of claim 12, where the user indication circuit is capable of providing user feedback in the form of at least one selected from the group consisting of: audio feedback, visual feedback, and tactile feedback.

15. The apparatus of claim 14, where the visual feedback comprises at least one light emitting diode (LED), wherein the at least one LED emits a green or a red light.

16. The apparatus of claim 12, wherein the voltage conditioning circuit is capable of outputting voltage between 4.75 V and 5.25 V and current of up to 4 amps.

17. The apparatus of claim 12, wherein the event comprise at least one selected from the group consisting of: the mobile device is fully charged, the voltage conditioning circuit output current is below the predetermined threshold, the voltage conditioning circuit output current is below the predetermined threshold for a determined time period, the mobile device charging is reconnected, the voltage conditioning circuit output current is above the predetermined threshold, and the voltage conditioning circuit output current is above the predetermined threshold for a determined time period.

* * * * *